United States Patent
Estrada et al.

(10) Patent No.: US 12,491,949 B2
(45) Date of Patent: Dec. 9, 2025

(54) AIR-GUIDING DEVICE FOR A PASSENGER CAR, AS WELL AS A PASSENGER CAR

(71) Applicant: Mercedes-Benz Group AG, Stuttgart (DE)

(72) Inventors: Gustavo Estrada, Stuttgart (DE); Fabian Reize, Winnenden (DE); Carsten Henke, Gemmrigheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 378 days.

(21) Appl. No.: 18/251,352

(22) PCT Filed: Oct. 4, 2021

(86) PCT No.: PCT/EP2021/077209
§ 371 (c)(1),
(2) Date: May 1, 2023

(87) PCT Pub. No.: WO2022/089877
PCT Pub. Date: May 5, 2022

(65) Prior Publication Data
US 2023/0415826 A1 Dec. 28, 2023

(30) Foreign Application Priority Data
Nov. 2, 2020 (DE) ............. 10 2020 006 694.1

(51) Int. Cl.
*B62D 35/00* (2006.01)
*B60K 11/08* (2006.01)
*B60R 19/52* (2006.01)

(52) U.S. Cl.
CPC ............ *B62D 35/005* (2013.01); *B60K 11/08* (2013.01); *B60R 19/52* (2013.01); *B60R 2019/527* (2013.01)

(58) Field of Classification Search
CPC .. B62D 35/005; B60K 11/08; B60R 2019/527
See application file for complete search history.

(56) References Cited

U.S. PATENT DOCUMENTS

| | | |
|---|---|---|
| 4,131,308 A | 12/1978 | Holka et al. |
| 4,460,213 A | 7/1984 | Janssen et al. |

(Continued)

FOREIGN PATENT DOCUMENTS

| | | |
|---|---|---|
| DE | 31 32 341 A1 | 3/1983 |
| DE | 36 13 303 C1 | 7/1987 |

(Continued)

OTHER PUBLICATIONS

PCT/EP2021/077209, International Search Report dated Jan. 14, 2022 (Two (2) pages).

(Continued)

Primary Examiner — Faye M Fleming
(74) Attorney, Agent, or Firm — Crowell & Moring LLP

(57) ABSTRACT

An air-guiding device of a front of a passenger car includes an air-guiding element which is movable at least in a subsection, at least in a vertical direction of the passenger car, between a raised position and a lowered position. A splitter and the air-guiding element are connected by a section which is formed from an elastically deformable material and is increasingly elastically deformable with increasing speed of a flow of air around the section. The air-guiding element forms a section of an aerofoil in the lowered position via which a downforce acting in the vertical direction of the passenger car downwards is created when there is a flow of air around the aerofoil in a longitudinal direction of the passenger car from a front to a back of the passenger car.

9 Claims, 4 Drawing Sheets

(56) References Cited

U.S. PATENT DOCUMENTS

| | | | |
|---|---|---|---|
| 4,770,457 A | 9/1988 | Tomforde | |
| 4,951,994 A | 8/1990 | Miwa | |
| 8,864,215 B2* | 10/2014 | Hoelzel | B62D 35/005 |
| | | | 296/180.5 |
| 9,738,328 B2 | 8/2017 | Fahland et al. | |
| 11,679,822 B2* | 6/2023 | Stubbe | B62D 35/005 |
| | | | 296/180.1 |
| 2010/0219661 A1 | 9/2010 | Butlin, Jr. et al. | |
| 2013/0049399 A1* | 2/2013 | Hoelzel | B62D 35/005 |
| | | | 296/180.5 |
| 2015/0232138 A1 | 8/2015 | Parry-Williams et al. | |
| 2017/0092022 A1* | 3/2017 | Heil | B62D 35/007 |

FOREIGN PATENT DOCUMENTS

| | | |
|---|---|---|
| DE | 36 30 645 A1 | 3/1988 |
| DE | 10 2014 104 156 A1 | 10/2015 |
| DE | 10 2016 007 273 A1 | 3/2017 |
| DE | 10 2015 012 895 A1 | 4/2017 |
| DE | 10 2016 122 932 B4 | 6/2017 |
| DE | 10 2019 007 655 A1 | 10/2020 |
| EP | 0 004 360 B1 | 10/1979 |
| GB | 2 400 585 A | 10/2004 |
| WO | WO 2018/178579 A1 | 10/2018 |

OTHER PUBLICATIONS

German-language German Office Action issued in German application No. 10 2020 006 694.1 dated Jan. 6, 2021 (Five (5) pages).

* cited by examiner

AIR-GUIDING DEVICE FOR A PASSENGER CAR, AS WELL AS A PASSENGER CAR

BACKGROUND AND SUMMARY OF THE INVENTION

The invention relates to an air-guiding device for the front of a passenger car. Furthermore, the invention relates to a passenger car with such an air-guiding device.

DE 10 2015 012 895 A1 discloses a trim assembly for a front end of a passenger car, comprising a front trim panel with a front spoiler, which is delimited by a shutter element on its lower end. An aerodynamic underbody paneling for the front end of a motor vehicle and that can be lowered towards a road is to be taken as known from DE 36 13 303 C1. Furthermore, a trim assembly for a front end of a passenger car is known from DE 10 2016 007 273 A1.

A motor vehicle front end emerges from the type-defining DE 31 32 341 A, which is provided with an air-guiding device, which has a front spoiler with a rounded front edge that is arranged under a bumper and mounted pivotably on its back end. The front spoiler is pivotable between a lowered and a raised position, wherein a diffuser function is achieved in the lowered position.

A motor vehicle that has a splitter on its front end as an aerodynamic means of increasing the strength of the downforce on the front of the vehicle, which splits the airflow flowing onto the vehicle and directs a partial airflow downwards in the direction of a road, results from DE 10 2016 122 932 B4.

It is the object of the present invention to provide an air-guiding device for the front of a passenger car, as well as a passenger car having such an air-guiding device, so that an especially high aerodynamic efficiency can be realized.

A first aspect of the invention relates to an air-guiding device for the front and thus for a front end of a passenger car. This means that the passenger car has the air-guiding device on its front end in its completely manufactured state. The air-guiding device has at least one air-guiding element. The air-guiding element is, for example, a trim element or a trim panel, by means of which at least one region of the passenger car arranged on the front of the passenger car can be covered and thus paneled to the bottom in the vertical direction of the vehicle. The region is, for example, a region of an engine bay, in which a drive motor for powering the passenger car, in particular formed as an internal combustion engine, can be arranged. In particular, the engine bay is at least partially, in particular at least mainly and thus more than half, or—as is provided in an especially preferred exemplary embodiment—completely, covered and thus paneled by the air-guiding element to the bottom in the vertical direction of the vehicle. Alternatively or additionally, at least one further component of the passenger car, in particular formed separately from the air-guiding device, can be arranged at least partially in the previously mentioned region, so that the component is at least partially covered and thus paneled to the bottom in the vertical direction of the vehicle by the air-guiding element. The component is, for example, a support element, in particular a longitudinal support. The support element can be a component of the self-supporting body of the passenger car. Further, the component can be the previously mentioned drive motor of the passenger car, which is thus, for example, at least partially, in particular at least mainly or completely covered and thus paneled by the air-guiding element to the bottom in the vertical direction of the vehicle.

The air-guiding element can be moved at least in a subsection and at least in the vertical direction of the vehicle, i.e., adjusted between a raised position and a lowered position, in particular relative to the region or relative to the component. By the raised position is to be understood that the air-guiding element or at least the subsection is arranged nearer to the component in the vertical direction of the vehicle in the raised position than in the lowered position, so that the air-guiding element or the subsection is spaced further apart from the component in the vertical direction of the vehicle in the lowered position than in the raised position. Again expressed in other words, if the passenger car is standing on or rolling along a, for example, at least substantially horizontal road, then the air-guiding element is arranged nearer to the road in the vertical direction of the vehicle in the lowered position than in the raised position, so that the air-guiding element is spaced further apart from the road in the vertical direction of the vehicle in the raised position than in the lowered position. This means that a distance between the air-guiding element or between the subsection of the air-guiding element and the road, running in the vertical direction of the vehicle, is lower in the lowered position than in the raised position.

In order to be able to realize an especially high aerodynamic efficiency of the passenger car, it is provided according to the invention that the air-guiding device has a splitter, that the splitter and the air-guiding element are connected by means of at least one section which is formed from an elastically deformable material and is increasingly elastically deformable with increasing speed of the flow around it, and that the air-guiding element forms at least one section of an aerofoil in the lowered position by means of which a downforce acting in the vertical direction of the vehicle downwards can be created when there is a flow of air around the aerofoil in the longitudinal direction of the vehicle from front to back. This means that in the invention, in comparison to planes, whose aerofoils generate lift forces acting upwards in a vertical direction and thus uplift if the aerofoils of the planes are flowed around by air, the aerofoil is an inverted, i.e., upside down, aerofoil which then, if the aerofoil according to the invention is flowed around by air from front to back in the longitudinal direction of the vehicle and thus, for example, during a forward travel of the passenger car, generates a downward force acting downwards in the vertical direction of the vehicle and thus a so-called downforce. The passenger car, which is also referred to as a vehicle, is thereby drawn, sucked or pressed downwards in the vertical direction of the vehicle or against the road, so to speak.

In the air-guiding device according to the invention it is preferably provided that only the splitter is effective when the air-guiding element is in the raised position, the splitter splitting the air hitting the front region of the motor car into partial air streams, wherein a partial air stream is guided under the motor car. In this functional position of the air-guiding device, the air-guiding element, which is preferably tabular, is arranged relative to the floor, in particular to a road, in such a way that no or no noteworthy diffuser effect is achieved. If the air-guiding element is now moved into its lowered position, the space underneath the air-guiding element to the road is narrowed, so that the air stream, or the partial air stream directed downwards by the splitter, of the air hitting the front region of the motor car is sped up. A diffuser is now formed by means of the air-guiding element, which leads to a corresponding downforce in the region of the front section.

It is furthermore provided according to the invention that the air-guiding element has at least one section formed from an elastically, in particular rubber-elastically, deformable material. Since the section, also referred to as the first section, is formed from the elastically, in particular rubber-elastically deformable material, the first section is itself elastically, in particular rubber-elastically deformable. The material is, for example, rubber or an elastomer. The section formed from the elastically deformable material is increasingly elastically deformable with increasing speed of the flow around it. This means that with the increasing relative speed between the air-guiding element and the air, for example, flowing around the air-guiding element in the longitudinal direction of the vehicle from front to back during a forward travel of the passenger car, the first section is increasingly elastically deformed. Again expressed in other words, the passenger car, for example, initially stands still on the previously-mentioned road and, while the passenger car is standing still on the road, the air-guiding element or at least its subsection is moved out of the raised position, also referred to as the retracted position, into the lowered position, also referred to as the extended position, thus the air-guiding element or at least the subsection of the air-guiding element is initially in the lowered position. If a forward travel of the passenger car along the road then begins while the air-guiding element is in the lowered (extended) position, then in this forward travel of the passenger car, the air-guiding element that is in the lowered position is flowed around with or by air, and indeed from front to back in the longitudinal direction of the vehicle. With increasing speed with which the passenger car is driven forward along the road, the previously-mentioned relative speed between the air-guiding element that is in the lowered position and the air flowing around the air-guiding element from front to back in the lowered position increases, wherein at least one force, resulting from this airflow around and acting on the air-guiding element that is initially in the lowered position, also increases. The first section is hereby then in particular elastically deformed if the driving speed and thus the relative speed exceed a certain limit and increase. By means of this elastic deformation resulting from the increasing relative speed, a lowering at least of the subsection of the air-guiding element, starting from the lowered position and occurring downwards in the vertical direction of the vehicle, can occur. This means that the elastic, in particular rubber-elastic, deformation of the first section resulting from the increasing relative speed or from the forward travel leads to at least the subsection or the air-guiding element moving from the lowered position further downwards in the vertical direction of the vehicle, i.e., is further lowered. The distance extending in the vertical direction of the vehicle between the air-guiding element or the subsection and the road compared to the lowered position is hereby further reduced, wherein this further lowering of the air-guiding element starting from the lowered position or at least of the subsection preferably results purely and simply from the flow around the aerofoil, without the air-guiding element or the subsection being actively lowered by means of an actuator.

In the context of the invention, what is to be understood by aerodynamic efficiency is the ratio of the downforce of the passenger car to its aerodynamic drag. In particular for powerful vehicles that are driven both in public traffic and also on closed-off racetracks, an especially high aerodynamic efficiency is desirable in order to achieve short lap times on the race track. If the vehicle is, however, driven in public road traffic, then the vehicle should be suitable for everyday use, in particular regarding its ground clearance or its ride height as well as regarding its angle of approach. In this context, the air-guiding device according to the invention is a flexible system, i.e., it can be used as required, which on the one hand provides an especially high downforce and thus an especially high aerodynamic efficiency of the passenger car and on the other hand provides an especially good suitability for everyday use and efficiency of the passenger car in public road traffic. In the raised position, the distance running in the vertical direction of the vehicle between the air-guiding element and the road surface is sufficiently large that the passenger car has a sufficiently large ground clearance or a sufficiently large ride height. The passenger car can thereby be driven without any problems in everyday use, and in particular can also be driven over objects like curbs collision-free. In the raised position of the air-guiding element, only or fundamentally only the splitter works, by means of which air, that flows onto the front of the passenger car from front to back in the longitudinal direction of the vehicle during a forward travel of this, is split, to be precise into an upper stream in the vertical direction of the vehicle and into a lower stream in the vertical direction of the vehicle, which, for example, flows under the passenger car. In the lowered position and/or in the retracted position, the air-guiding device functions, for example, as a diffuser, by means of which especially advantageous downforce can be implemented. The movement or adjustment of the air-guiding element between the positions, also referred to as locations, can, for example, be achieved manually, in that, for example, the driver of the passenger car manually operates a control element arranged in the interior of the passenger car.

The movement of the air-guiding element from the raised position into the lowered position leads to the formation of the previously described upside down aerofoil, which is also referred to as the blade profile. As is well-known of conventional aerofoils from the general prior art, the aerofoil accelerates the air flowing around the aerofoil from front to back in the longitudinal direction of the vehicle, and indeed according to the invention in such a way that the downforce acting downwards in the vertical direction of the vehicle is created. By means of the acceleration of the air, a pressure between the air-guiding device and the road, also referred to as the ground, decreases, for example in comparison to the retracted position, whereby the passenger car is drawn or pressed against the road, in particular according to the Venturi effect. The aerodynamic drag of the passenger car is thereby simultaneously reduced, in particular in comparison to the raised position, so that an especially high aerodynamic efficiency can be realized.

The air-guiding element can, for example by means of an actuator, be actively moved between the lowered position and the raised position. It is also conceivable that at least the lowering or, in the case of a pivotable mounting, the folding down of the air-guiding element simply occurs automatically due it its weight, in particular after triggering a latching, locking or other lock. Because at least the section provided between the splitter and the air-guiding element is formed from the elastically deformable material, an active and elastic, aerodynamic profile, which is elastically deformed, i.e., distorted, with increasing speed by means of a negative pressure acting on the air-guiding element. This negative pressure in particular results from the fact that the aerofoil creates the downforce acting downwards in the vertical direction of the vehicle. The distance between the air-guiding element and the ground decreases by means of this deformation of the first section and by means of the further lowering at least of the subsection, starting from the lowered position, resulting from this, whereby the downforce is further increased, in particular on a front axle of the passenger car. An increasing or larger, elastic deformation of the first section of the air-guiding element and thus an increasing lowering at least of the subsection of the air-guiding element are associated with higher downforce and are in particular caused by means of an increase of the driving speed with which the passenger car is being driven forward.

A further advantage of the elastic deformability of the first part of the air-guiding element is that an advantageous management of touchdown can be realized. Damages to the air-guiding device can then thereby, for example, be avoided if the air-guiding device, in particular the air-guiding element, touches down on an object that, for example, is positioned on the road. If, for example, the air-guiding element that is in the lowered position or in an additionally further lowered position collides with an object that, for example, is located on the road, so that, for example, an impact or impulse or blow acting upwards in the vertical direction of the vehicle acts on the air-guiding element, the fact that the section of the air-guiding element is elastically deformable means that the air-guiding element can thereby avoid this impact, blow or impulse, in particular upwards in the vertical direction of the vehicle, for example in such a way that the first section of the air-guiding element is deformed by the blow, impulse or impact. Then, i.e., after the end of the collision and thus after the end of the blow, of the impact or of the impulse, the elastically deformed section and thus also the air-guiding element return or spring back into an initial position in which the collision occurred. Excessive damages of the air-guiding device can thereby be effectively and easily avoided.

Overall, the advantages can be achieved by means of the invention that a large increase in downforce on the front axle in comparison to conventional solutions can be shown with the same reduction of the aerodynamic drag. An especially high aerodynamic efficiency of the passenger car can thus be realized. Since the elastic section of the air-guiding device is increasingly elastically deformed with increasing driving speed, so that at least a subsection of the air-guiding device is further lowered compared to the lowered position with increasing driving speed, the downforce increases further with increasing driving speed. An actuator like, for example, electric, hydraulic or pneumatic actuators can thereby be omitted, in particular in order to further lower the air-guiding element or at least its subsection, starting from the lowered position. At high cornering speeds or with high lateral acceleration of the passenger car, the directional stability of the passenger car increases by means of the increase in downforce on the front axle. The driver of the passenger car thus profits from an especially precise steering feel and especially agile steering. Furthermore, an especially advantageous suitability for everyday use can be guaranteed in the raised position.

In order to be able to especially effectively further lower the subsection of the air-guiding element with increasing driving speed, it is provided in an embodiment of the invention that the aerofoil is partially formed by means of the section of the air-guiding element formed from the elastically deformable material.

In a preferred exemplary embodiment, it is provided that the air-guiding element and/or the splitter are/is formed from a non-rubber-elastically deformable material. In a further, especially advantageous embodiment of the invention, the material is a fibre-reinforced plastic, in particular a carbon fibre-reinforced plastic. Firstly, the weight of the air-guiding element can thereby be kept especially low, and secondly an especially high rigidity can also be realized, so that the air can be controlled especially advantageously. Thus, an especially high level of aerodynamic efficiency can be achieved.

A further embodiment is characterized in that the section of the air-guiding device formed from the elastically deformable material is at least partially a component of the subsection of the air-guiding element that can be moved between the raised position and the lowered position. The elastic section can, for example, be injection-moulded onto the air-guiding element and also onto the splitter. The air flowing into and around the air guiding element can thereby flow into and around the elastic section especially advantageously and in particular directly, so that this is effectively elastically deformed and as a result, at least the subsection is advantageously lowered, in particular without using a separate additional actuator.

Finally, it has been shown to be especially advantageous if the splitter, the elastic section and the air-guiding element can be mounted or are mounted on the passenger car in the horizontal direction so as to be movable as one unit in the longitudinal direction of the motor car, and can be moved together between a position of being retracted into the nose of the motor car and a position of being extended forwards. This means that it is preferably provided that the movement, occurring in the vertical direction of the vehicle, of the subsection of the air-guiding element between the positions can be overlaid by an in particular translational movement occurring in the longitudinal direction of the vehicle and in particular relative to the component. It is also conceivable that the unit is initially extended when the air-guiding element is in the raised position, before the air-guiding element is lowered. Should the unit be retracted again, then here the air-guiding element should initially be transferred to its raised position, so that retracting the unit subsequently only then takes place.

A second aspect of the invention relates to a passenger car having an air-guiding device according to the invention. Advantages and advantageous embodiments of the first aspect of the invention are to be regarded as advantages and advantageous embodiments of the second aspect of the invention and vice versa.

Further advantages and details of the invention arise from the following description and with the aid of the drawings.

DETAILED DESCRIPTION OF THE DRAWINGS

Figure 1:
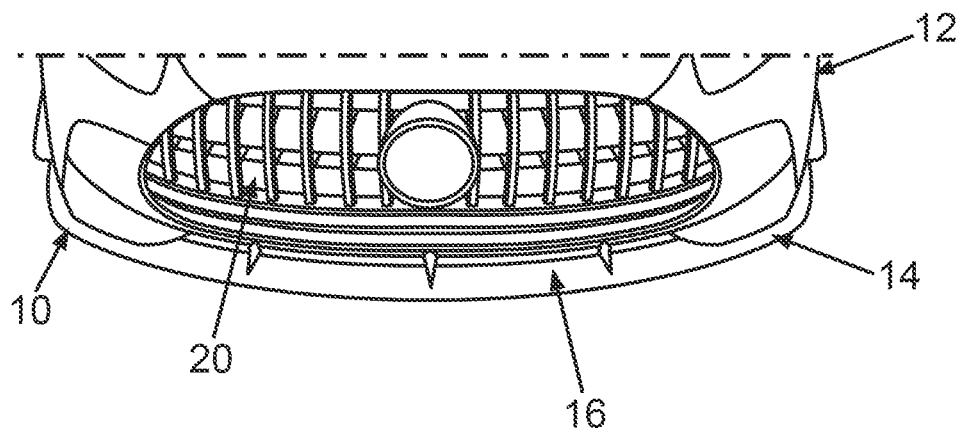
FIG. 1 is a partial, schematic and perspective front view of a passenger car, on the front of which an air-guiding device is arranged, which has an air-guiding element having at least one section formed from an elastically deformable material.

In the figures, identical or functionally identical elements are provided with the same reference numerals, so that reference is therefore made to the description of the preceding figures.

FIG. 1 shows a passenger car 10 in a partial, schematic and perspective front view, on the front 12 of which an air-guiding device 14 is arranged. The air-guiding device 14 comprises, for example, a so-called splitter 16, which is an aerodynamic device, which is used, among other things, for increasing the strength of the downforce on the front of the vehicle. During forward travel of the passenger car, the airflow flowing onto the front region of the motor car is split, wherein a partial airflow is directed upwards and is, for example, used for the cooling of components or assemblies, while another partial airflow is directed under the passenger car. Since the air-guiding device 14 or the splitter 16 has a corresponding profile, preferably an inverted blade profile or a profile which comes close to an inverted blade profile, at least in its operation, the air directed under the splitter 14 is accelerated when flowing under the passenger car. This creates a negative pressure and thus downforce on the front axle.

The splitter 16 is preferably formed as a plate-like shape, wherein this runs horizontally or fundamentally horizontally, and extends at least across a subsection of the passenger car in the transverse direction of the vehicle (the y direction in the motor vehicle coordinates system). Furthermore, the air-guiding device 14 has a rounded or fundamentally rounded front edge 17.

Figure 2:
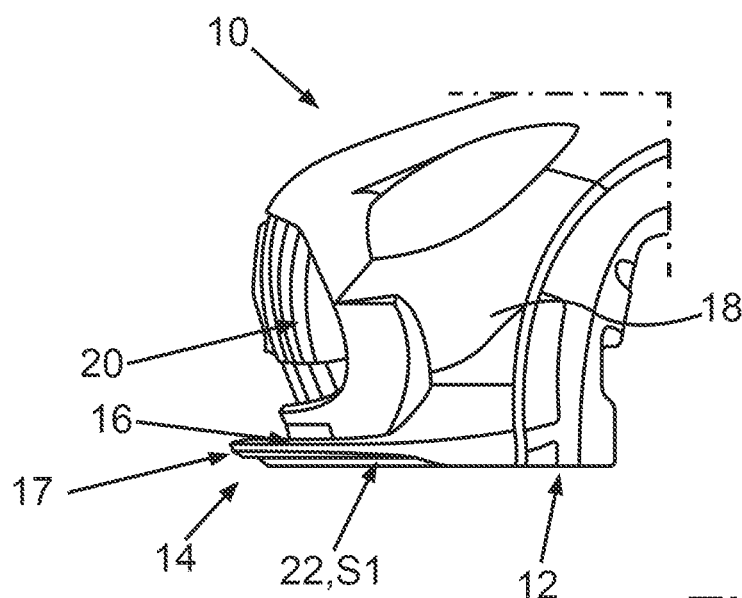
FIG. 2 is a partial schematic side view of the passenger car.
Figure 3:
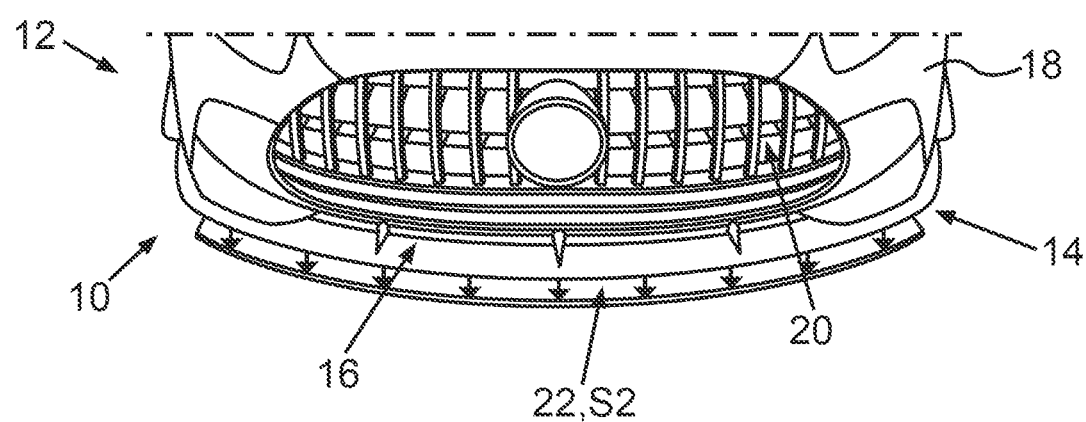
FIG. 3 is a partial further schematic and perspective front view of the passenger car.

In an overview with FIG. 2 it can be recognized that the passenger car 10 has a front bumper trim 18 on its front 12, which, for example, is connected to the air-guiding device 14 and/or to the splitter 16 at the top in the vertical direction of the vehicle. By means of the bumper trim 18, a front flexible crossmember of the passenger car 10, that cannot be seen in the figures, is covered and thus paneled to the front in the longitudinal direction of the vehicle as well as also outwards on both sides in the transverse direction of the vehicle.

The passenger car 10 further has a region formed as an engine bay on its front 12, wherein a drive motor for powering the passenger car 10, for example formed as an internal combustion engine, is arranged in the engine bay. At least a subsection of the engine bay is overlapped by a grill 20, also referred to as a radiator grill, to the front in the longitudinal direction of the vehicle, through which air can flow, for example during forward travel of the passenger car 10. The air flowing through the grill 20 from front to back in the longitudinal direction of the vehicle flows into the engine bay and can, for example, flow onto and around a cooler arranged in the engine bay. The cooler and the drive motor are, for example, components or parts of the passenger car 10 arranged in the engine bay.

Figure 5:
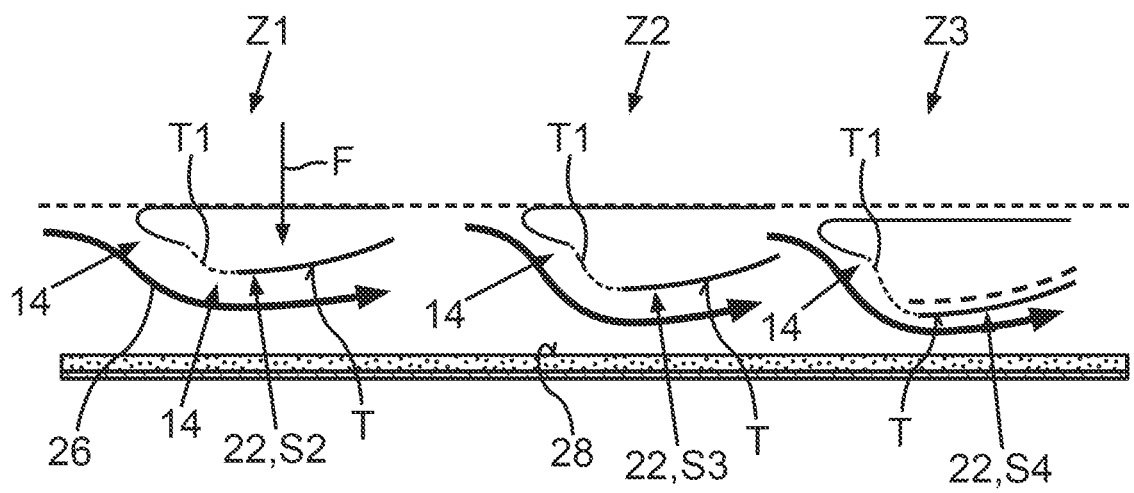
FIG. 5 shows respective partial schematic and sectional side views of the air-guiding device.
Figure 6:
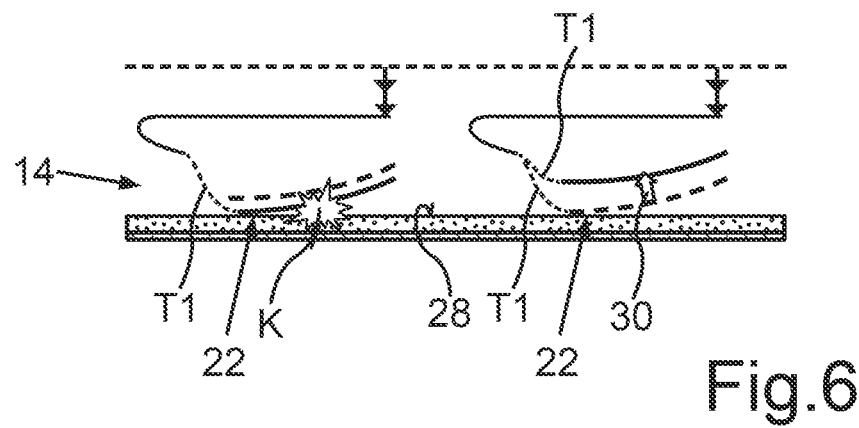
FIG. 6 shows respective partial further schematic and sectional side views of the air-guiding device.
Figure 7:
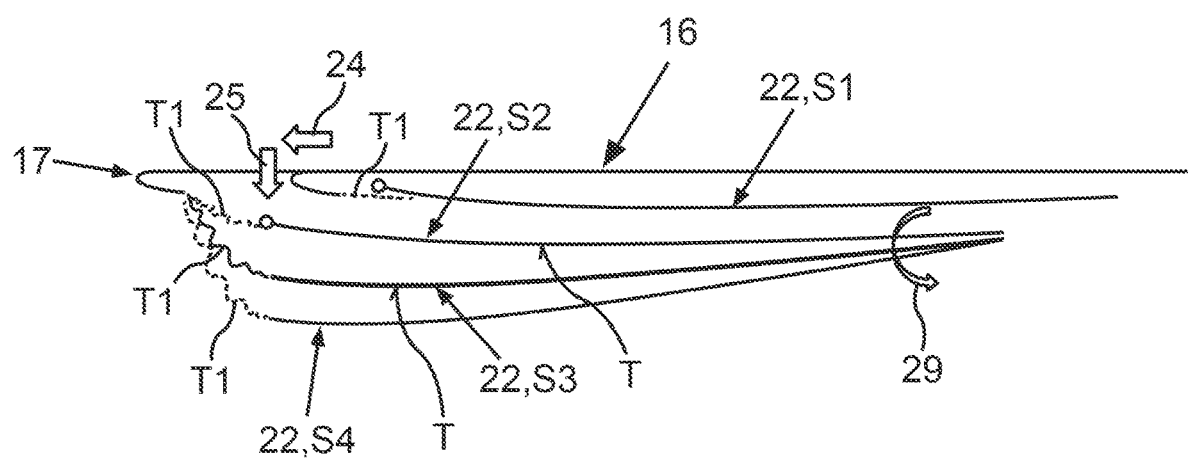
FIG. 7 is a partial further schematic and sectional side view of the air-guiding device.

It can be especially well seen in overview with FIGS. 5 to 7 that the air-guiding device 14 also has at least one air-guiding element 22 as well as the splitter 16. For example, at least a section of the engine bay is overlapped and thus covered to the bottom in the vertical direction of the vehicle by the air-guiding element 22, so that the air-guiding element 22 can be paneling. Alternatively or additionally, at least a section at least of one of the components can be overlaid and thus covered to the bottom in the vertical direction of the vehicle (z direction in the motor vehicle coordinates system) by the air-guiding element 22. It is in particular conceivable that the air-guiding element 22 is a component of the splitter 16.

As can been seen in FIGS. 1 to 5, the air-guiding element 22 can be moved at least in a subsection, in particular at least mostly or completely, between a raised position S1, which is also referred to as a retracted position, and a lowered position S2, which is also referred to as an extended position, at least in the vertical direction of the vehicle and preferably also in the longitudinal direction of the vehicle (x direction in the motor vehicle coordinates system), in particular relative to the previously-mentioned component as well as preferably relative to the self-supporting body of the passenger car 10.

Figure 4:
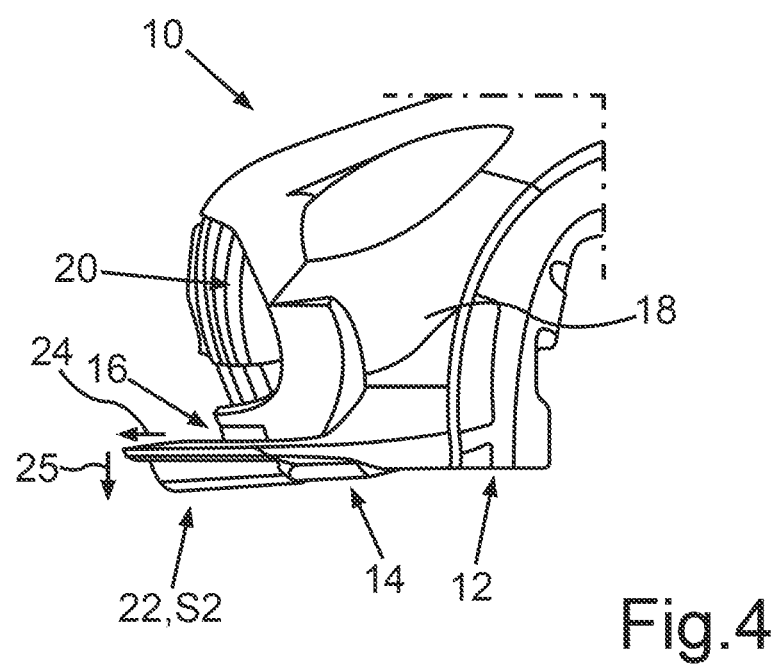
FIG. 4 is a partial further schematic side view of the passenger car.

As is illustrated by arrows 24 and 25 in FIG. 4, the whole air-guiding device 14, so in particular the unit/the group comprising the splitter 16, the elastic section T1 and the air-guiding element 22, is initially moved—in order to move the air-guiding element 22 from the raised position S1 into the lowered position S2—to the front in the longitudinal direction of the vehicle—the direction the arrow 24 follows—and after reaching the extended position, the air-guiding element 22 is moved downwards, in particular relative to the respective components, in the vertical direction of the vehicle—the direction the arrow 25 follows. In order to move the air-guiding element 22 out of the lowered position S2 into the raised position S1, the air-guiding element 22 is moved upwards in the vertical direction of the vehicle and backwards in the longitudinal direction of the vehicle, relative to the respective components and in particular relative to the body, also referred to as the shell.

As can be especially well seen in FIG. 5, the air-guiding element 22 forms, at least in the lowered position S2, an aerofoil T together or working with the splitter 16 and a further section T1, which will be discussed in more detail below, by means of which aerofoil T, when there is a flow of air around the aerofoil T from front to back in the longitudinal direction of the vehicle, illustrated by an arrow 26 in FIG. 5, a downforce, acting downwards in the vertical direction of the vehicle and illustrated by a force arrow F in FIG. 5, can be created.

As is sufficiently known from the general prior art, aerofoils and thus aerofoil profiles of aeroplanes then create, if air flows from front to back over the aerofoil, a lifting force acting upwards in the vertical direction and thus a lift, so that the respective aeroplane flies. Compared to such an aerofoil of an aeroplane, the aerofoil T of the air-guiding device 14 is an inverted or upside down aerofoil, since the aerofoil T then creates the downward force acting downwards in the vertical direction of the vehicle and thus a downforce if air, illustrated by the arrow 26 in FIG. 5, flows around the aerofoil T from front to back in the longitudinal direction of the vehicle. The passenger car 10 is, for example, then thereby drawn or pressed against a road 28, if it is driven forwards along the road 28 (FIG. 5), also referred to as the ground.

The air-guiding device 14 or the air-guiding element 22 has at least the section T1 which is formed from an elastically or rubber-elastically deformable material, in particular made of rubber or an elastomer, and is therefore elastically or rubber-elastically deformable. The section T1 is, for example, formed as a lip, in particular as a rubber lip, and represents a connecting means between the air-guiding element 22 and the splitter 16. To this end, the section T1 is fixed to the splitter 16, preferably in the region of its front edge 17, in particular under this, and offset towards the rear in the longitudinal direction of the vehicle at one end, and to the front transverse edge region of the air-guiding element 22 at the other end. The air-guiding element 22 is mounted pivotably around an axis, which preferably runs in the transverse direction of the motor car, on its back edge region, so that the air-guiding element 22 can be lowered or raised again on its front edge region, on which the section T1 is supported. Together with the pivotably movable mounting around the axis, there is a tilting and turning of the air-guiding element 22 here. In or starting from the lowered position S2, the section T1 is increasingly elastically or rubber-elastically deformable with increasing speed of the airflow around it, i.e., with increasing relative speed between the flow illustrated by the arrow 26 and the aerofoil T, whereby a further lowering at least of the subsection of the air-guiding element 22 or of the air-guiding element 22 can itself be effected, starting from the extended position S2 and occurring downwards in the vertical direction of the vehicle, in that the air-guiding element 22 pivots around the pivot mounting on its back end in such a way that its front edge area approaches the floor, for example a road. In other words, a speed with which the passenger car 10 is driven forward along the road 28 while the air-guiding element 22 is initially in the lowered position S2 is increased, therefore the relative speed between the aerofoil T and the air flowing around the aerofoil T from front to back in the longitudinal direction of the vehicle, and illustrated by the arrow 26 in FIG. 5, increases. A force acting on the air-guiding element 22 that is initially in the lowered position S2 and, for example, directed downwards in the vertical direction of the vehicle, such as for example the downforce, thereby, for example, also increases, so that the section T1 is increasingly elastically deformed with increasing driving speed or with increasing force in such a way that the air-guiding element 22 or at least its subsection is lowered further downwards in the vertical direction of the vehicle, starting from the lowered position S2. So that the section T1 can elastically deform in the way described above and a lowering or a further lowering of the air-guiding element 22 relative to the splitter 16 is thus enabled, the splitter 16 is formed so as to be correspondingly stable and preferably remains in its position and is not pulled downwards or is only pulled downwards to a very small extent by means of the air-guiding element 22 and the section T1. The splitter 16 therefore resists the forces causing the deformation of the section T1 and is only insignificantly deformed or bent downwards—if at all.

The whole air-guiding device 14, comprising the splitter 16, the section T1 as well as the air-guiding element 22 that is mounted pivotably on its back end, is mounted horizontally on the passenger car so as to be movable as one unit in the longitudinal direction of the motor car and can be moved from a position retracted into the nose of the motor vehicle, which is shown in FIG. 2, into an extended position projecting forwards over the nose or the front of the car, as it is shown in FIG. 4. In its retracted position according to FIG. 2, the air-guiding device 14, in particular the air-guiding element 22, is held by means of a locking device, (not shown in the figures) in such a way that it cannot tilt downwards at its front end or sink due to deformation of the section T1. In the retracted position, only the splitter 16 is practically effective and performs its original function, while the air-guiding element 22 that is in its raised position still has no or practically no diffuser function, i.e., this still does not narrow the space underneath the splitter 16 and the road. In order to be able to move the air-guiding device 14 out of its retracted position (FIG. 2) into its forwards extended position (FIG. 4), the lock initially has to be lifted once, so that the air-guiding device 14 can be moved as a whole/a group. The section T1 is largely dimensioned or provided with an excess of material, so that when the air-guiding device 14 is extended, the air-guiding element 22 is pivoted around its mounting axis and is thus lowered downwards at the front, until the elastic section T1 is tensioned at least to a certain extent. This tilting preferably occurs independently due to the gravity acting on the air-guiding element 22.

The function of the air-guiding device 14, in particular that of the elastic section T1 is described in more detail below, based on FIG. 5. Here, the air-guiding device 14 is shown highly schematically, already in its extended position according to FIG. 4. In the left illustration of FIG. 5, a first state Z1 of the air-guiding device 14 is shown. In the state Z1, the passenger car 10 is, for example, stationary on the road 28, or the passenger car 10 is being driven forwards along the road 28 at only a low driving speed, so that the air-guiding element 22 is in the lowered position S2. In the central illustration of FIG. 5, a second state of the air-guiding device 14 is also labelled Z2. In the second state Z2, the passenger car 10 is being driven forward along the road 28 with a higher driving speed compared to the state Z1. In the state Z2, the driving speed of the passenger car 10 is so high that the section T1 is elastically deformed by the airflow around it compared to the state Z1 in such a way that the air-guiding element 22 is lowered further downwards in the vertical direction of the vehicle compared to the state Z1 and thus compared to the lowered position S2 and thus assumes a third position S3. Here, it is again indicated that the lowering occurs by means of a pivoting of the air-guiding element 22 around the axis on its end region that is facing away from the section T1 so that the air-guiding element 22 tilts downwards at the front. In the third position S3, at least the subsection of the air-guiding element 22 is arranged further down in the vertical direction of the vehicle than in the lowered position S2. Furthermore, a third state of the air-guiding device 14 is designated with Z3 in the right illustration of FIG. 5. In the third state Z3, the passenger car 10 is driven forward along the road 28 with a still higher driving speed compared to the second state Z2. As a result, the section T1 is more strongly elastically deformed in the third state Z3 compared to the second state Z2, so that, in the third state Z3, the air-guiding element 22 is lowered further downwards in the vertical direction of the vehicle compared to the second state Z2. The air-guiding element 22 thus occupies a fourth position S4 in the third state Z3, in which the air-guiding element 22 is arranged further downwards in the vertical direction of the vehicle compared to the third state Z3 or compared to the third position S3.

The further lowering of the air-guiding element 22 from the lowered position S2 into the position S3 or S4 occurs exclusively by means of increasing the driving speed of the passenger car 10 or exclusively by means of the increasing relative speed between the aerofoil T and the airflow around it and thus without the use of additional, active actuators.

The air-guiding element 22 and in particular its movement or movability between the positions S1, S2, S3 and S4 can also be especially well recognized from FIG. 7. By means of an arrow 29 it is illustrated that the air-guiding element 22 or at least its subsection is pivotable between the positions S1-4 around an axis of rotation relative to the respective, previously mentioned components or relative to the self-supporting body. It can also be recognized from FIG. 7 that the section T1 is at least partially, in particular at least mostly or completely a component of the aerofoil T, so that the aerofoil T is partially formed by the section T1. The air-guiding element 22 forms at least one second section T2 of the aerofoil T connecting to the first section T1, which is formed from the elastically deformable material, at the back in the longitudinal direction of the vehicle. The air-guiding element 22 connects directly to the section T1 at the back in the longitudinal direction of the vehicle, wherein both the section T1 in itself and also the air-guiding element 22 is preferably formed as one piece. The air-guiding element 22 is formed from a non-rubber-elastically deformable material. In the exemplary embodiment shown the figures, the material is a carbon fibre-reinforced plastic, so that an especially high rigidity of the air-guiding element 22 can be achieved in an especially weight-optimized manner. The air that initially flows onto and around the section T1 and from the section T1 to the air-guiding element 22 can thereby by advantageously directed by means of the air-guiding element 22, without it leading to excessive deformations of the air-guiding element 22. The aerofoil T is thereby also partially formed by the second section T2, so the air-guiding element 22. This means that the air-guiding element 22 is at least partially, in particular at least mainly or completely, a component of the aerofoil T.

The air-guiding device 14 and the air-guiding element 22 are each represented in different positions in FIG. 7. The operation of the air-guiding device 14 is described in yet more detail below. The air-guiding device 14 is shown in its retracted position at the top right in the representation according to FIG. 7, in which position the front edge 17 of the splitter 16 is arranged in a rearward position, as is also shown in FIG. 2, and the air-guiding element 22 is arranged in a raised position—here roughly parallel to a road. So, the air-guiding device 14 is moved forwards in the direction of forward travel, in the direction of the arrow 24 and before or thereby, so during the moving, the locking of the air-guiding element 22 is achieved, so that this can tilt downwards at the front, at the latest after reaching the extended position of the splitter 16, as shown in FIG. 4, which is possible at its back end in the direction of the arrow 29, by means of the pivot mounting (not shown). The air-guiding element 22 is thereby moved into its position S2. By means of correspondingly high driving speeds, the air-guiding element 22 can sink further in the positions S3 and S4, which is possible by means of the elastic section T1. If the wind load acting on the air-guiding device becomes lower, then the elastic section T1 contracts, so that the air-guiding element 22 moves back from the position S4 into S3 as far as S2, in particular pivots around the mounting axis, against the direction of the arrow 29 and is thereby raised. The lowering of the air-guiding element 22 in the region of its front edge region leads to a narrowing of the space under the car into which the air can flow freely and also provides yet another direction of flow for it. This leads to the so-called "Venturi effect" with a driving motor car, so that the air flows faster, if it is restricted.

A so-called management of touchdown of the air-guiding device 14 is indicated especially well by FIG. 6. As is shown especially schematically in FIG. 6 and is referred to with K, this can then in particular lead to a collision of the air-guiding element 22 with the floor or an object, for example a curb or a stone, an item or similar situated on the floor, if the air-guiding element 22 is in the position S2, S3 or in the position S4. For example, the air-guiding element 22 is a shell, also referred to as a lower shell. Since the air-guiding element 22 is, for example, formed from a carbon fibre-reinforced plastic, this is also referred to as a carbon shell or carbon lower shell. Since the section T1 is elastically deformable, the air-guiding element 22 can deflect upwards in the vertical direction of the vehicle in a collision K with the road 28 or with an object arranged on the road 28 in such a way that it pivots upwards around its mounting axis. After the end of the collision K, the elastically deformed section T1 can at least partially relax and therefore spring back, so that the air-guiding element 22 springs back into its starting position, which it had occupied before the collision K. Excessive damage of the air-guiding device 14 can thereby be avoided.

The section T1 is in particular increasingly elastically deformed with increasing driving speed, because, with increasing driving speed or with increasing relative speed between the aerofoil T and the flow around it, a negative pressure acting on the aerofoil T or on the section T1, in particular between the road 28 and the air-guiding device 14, increases. With increasing elastic deformation of the section T1, the air-guiding element 22 is increasingly lowered downwards in the vertical direction of the vehicle, whereby the downward force or the downforce is further increased. This increase of the downforce starting from the position S2 is in particular exclusively achieved by means of the increasing negative pressure and thus without active actuators. By means of lowering or extending the air-guiding element 22, the aerodynamic drag of the passenger car 10 is also reduced, so that, by means of the air-guiding element 14, an especially high aerodynamic efficiency of the passenger car 10 can be shown.

The invention claimed is:

1. An air-guiding device (14) of a front (12) of a passenger car (10), comprising:
   an air-guiding element (22) which is movable at least in a subsection, at least in a vertical direction of the passenger car (10), between a raised position (S1) and a lowered position (S2); and
   a splitter (16), wherein the splitter (16) and the air-guiding element (22) are connected by a section (T1) which is formed from an elastically deformable material and is increasingly elastically deformable with increasing speed of a flow (26) of air around the section (T1);
   wherein the air-guiding element (22) forms a section of an aerofoil (T) in the lowered position (S2) via which a downforce (F) acting in the vertical direction of the passenger car (10) downwards is created when there is a flow (26) of air around the aerofoil (T) in a longitudinal direction of the passenger car (10) from a front to a back of the passenger car (10);
   wherein the splitter (16), the section (T1) and the air-guiding element (22) are mountable on the passenger car (10) in a horizontal direction so as to be longitudinally movable as one unit in the longitudinal direction of the passenger car (10) and are longitudinally movable together between a first longitudinal position of being retracted into a nose of the passenger car (10) and a second longitudinal position projecting forwards over the nose of the passenger car (10).

2. The air-guiding device (14) according to claim 1, wherein the aerofoil (T) is formed partially by the section (T1) and partially by the splitter (16).

3. The air-guiding device (14) according to claim 1, wherein the air-guiding element (22) and/or the splitter (16) are/is formed from a non-rubber-elastically deformable material.

4. The air-guiding device (14) according to claim 1, wherein the section (T1) is formed elastically such that, with increasing speed of a flow (26) of air around the air-guiding device (14), a further lowering at least of a subsection of the air-guiding element (22) in the vertical direction of the passenger car (10) downwards is effectable starting from the lowered position (S2).

5. The air-guiding device (14) according to claim 1, wherein the section (T1) is pleated at least in portions when the air-guiding element (22) is in the raised position (S1).

6. The air-guiding device (14) according to claim 1, wherein the air-guiding element (22) is fixable in a relative position with respect to the splitter (16) in the raised position (S1).

7. The air-guiding device (14) according to claim 1, wherein the air-guiding element (22) is pivotably mountable on a back transverse edge region and wherein a position of a pivot axis in the vertical direction of the passenger car (10) is consistent in every position of the air-guiding device.

8. The air-guiding device (14) according to claim 1, wherein the air-guiding element (22) is tabular.

9. A passenger car, comprising:
the air-guiding device (14) according to claim 1.

* * * * *